United States Patent
Aziz et al.

(10) Patent No.: US 8,731,040 B2
(45) Date of Patent: May 20, 2014

(54) ADAPTING TRANSFER FUNCTIONS OF CONTINUOUS-TIME EQUALIZERS

(75) Inventors: Pervez Aziz, Dallas, TX (US); Amaresh Malipatil, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 377 days.

(21) Appl. No.: 13/231,097

(22) Filed: Sep. 13, 2011

(65) Prior Publication Data

US 2012/0076181 A1 Mar. 29, 2012

Related U.S. Application Data

(60) Provisional application No. 61/387,028, filed on Sep. 28, 2010.

(51) Int. Cl.
*H03H 7/30* (2006.01)

(52) U.S. Cl.
USPC .......................................................... 375/233

(58) Field of Classification Search
USPC .......... 375/232, 233, 346, 348–350; 708/322, 708/323
See application file for complete search history.

(56) References Cited

U.S. PATENT DOCUMENTS

| | | | |
|---|---|---|---|
| 3,879,664 A * | 4/1975 | Monsen | 375/232 |
| 6,240,133 B1 * | 5/2001 | Sommer et al. | 375/232 |
| 7,606,301 B2 | 10/2009 | Aziz et al. | |
| 2010/0046598 A1 | 2/2010 | Zhong et al. | |
| 2010/0329325 A1 * | 12/2010 | Mobin et al. | 375/232 |
| 2010/0329326 A1 * | 12/2010 | Aziz et al. | 375/233 |

* cited by examiner

*Primary Examiner* — Young T. Tse

(57) ABSTRACT

Described embodiments provide a method of adjusting configurable parameters of at least one linear equalizer in a communication system. A transmitting device applies an input signal to a receiver. The at least one linear equalizer equalizes the input signal. A sampler generates one or more sampled values of the input signal. A data detector digitizes the sampled values of the input signal. At least one error detection module generates an error signal based on one or more of a plurality of sampled values of the input signal and a target value. An adaptation module determines a gradient signal based on a comparison of one or more of the plurality of sampled values of the input signal and one or more of the plurality of values of the error signal. The adaptation module adjusts a transfer function of the at least one linear equalizer based on the determined gradient signal.

23 Claims, 6 Drawing Sheets

SLICING/QUANTIZATION OF VARIOUS SIGNALS FOR ADAPTATION

COEFFICIENT GENERATION FOR ADAPTATION HARDWARE

ADAPTING TRANSFER FUNCTIONS OF CONTINUOUS-TIME EQUALIZERS

CROSS-REFERENCE TO RELATED APPLICATIONS

This application claims the benefit of the filing date of U.S. provisional application No. 61/387,028, filed Sep. 28, 2010, the teachings of which are incorporated herein in their entireties by reference.

This application is related to U.S. patent application Ser. No. 12/193,802, filed Aug. 19, 2008, the teachings of which are incorporated herein in their entireties by reference.

BACKGROUND OF THE INVENTION

1. Field of the Invention

The present invention relates to generally to decision-feedback equalization techniques and, in particular, to adaptation techniques for sampling in decision-feedback equalization.

2. Description of the Related Art

Digital communication receivers typically sample an analog waveform and detect the sampled data. Signals arriving at a receiver might be corrupted by intersymbol interference (ISI), crosstalk, echo, and other noise. Thus, receivers typically equalize the channel, to compensate for such distortions, and decode the encoded signals at increasingly high clock rates. Decision-feedback equalization (DFE) is a widely-used technique for removing intersymbol interference and other noise. Generally, decision-feedback equalization utilizes a nonlinear equalizer to equalize the channel using a feedback loop based on previously decided symbols.

In one typical DFE implementation, a received analog signal is sampled and compared to one or more thresholds to generate the detected data. A DFE correction signal, v(t), is subtracted in a feedback fashion to produce a DFE corrected signal w(t). A continuous time analog equalizer (AEQ) might be employed to equalize communication systems such as a magnetic recording channel or high speed serial links employing backplanes, copper cables, optical links, etc. The AEQ in general might be implemented as one of a wide variety of topologies and configurations from the Butterworth, Chebyshev and Equiripple filters, or other topologies. The AEQ might also be implemented as a filter of varying order. Despite the variation in AEQ topologies, two high level parameters are typically relevant for equalization: high frequency peaking and bandwidth. Peaking allows for boosting back the high frequency components attenuated by a channel, and a finite bandwidth limits circuit noise and minimizes aliasing due to sampling which often follows the AEQ. AEQ parameters are desirably self adapting as the required peaking depends on the channel loss.

Known approaches for adapting the AEQ parameters might comprise implementing the entire LMS algorithm in the analog domain, or employing analog circuit techniques to adapt the AEQ parameters. Approaches employing a digital adaptation algorithm might typically require pre-calibration and measurement of channel pulse responses. Other approaches might employ a linear combiner form of an AEQ and require emulating analog filter states with digital equivalent states for adaptation. Thus, there is a need for adapting a class of AEQ transfer functions based on coefficients related to the impulse response of the AEQ without a priori channel training or measurement.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of adjusting configurable parameters of at least one linear equalizer in a communication system. A transmitting device applies an input signal to a receiver. The at least one linear equalizer equalizes the input signal. A sampler generates one or more sampled values of the input signal. A data detector digitizes the sampled values of the input signal. At least one error detection module generates an error signal based on one or more of a plurality of sampled values of the input signal and a target value. An adaptation module determines a gradient signal based on a comparison of one or more of the plurality of sampled values of the input signal and one or more of the plurality of values of the error signal. The adaptation module adjusts a transfer function of the at least one linear equalizer based on the determined gradient signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Described embodiments of the present invention provide a method and system of adaptation of a linear equalizer using a decision feedback equalizer (DFE).

Table 1 summarizes a list of acronyms employed throughout this specification as an aid to understanding the described embodiments of the present invention:

TABLE 1

| | | | |
|---|---|---|---|
| SERDES | Serializer/Deserializer | IC | Integrated Circuit |
| TXFIR | Transmit Finite Impulse Response | AEQ | Analog Equalization |
| CDR | Clock and Data Recovery | DFE | Decision Feedback Equalization |
| BER | Bit Error Rate | DAC | Digital to Analog Converter |
| ADC | Analog to Digital Converter | ISI | Intersymbol Interference |
| IRWG | Impulse Response Weighted Gradient | | |

Figure 1:
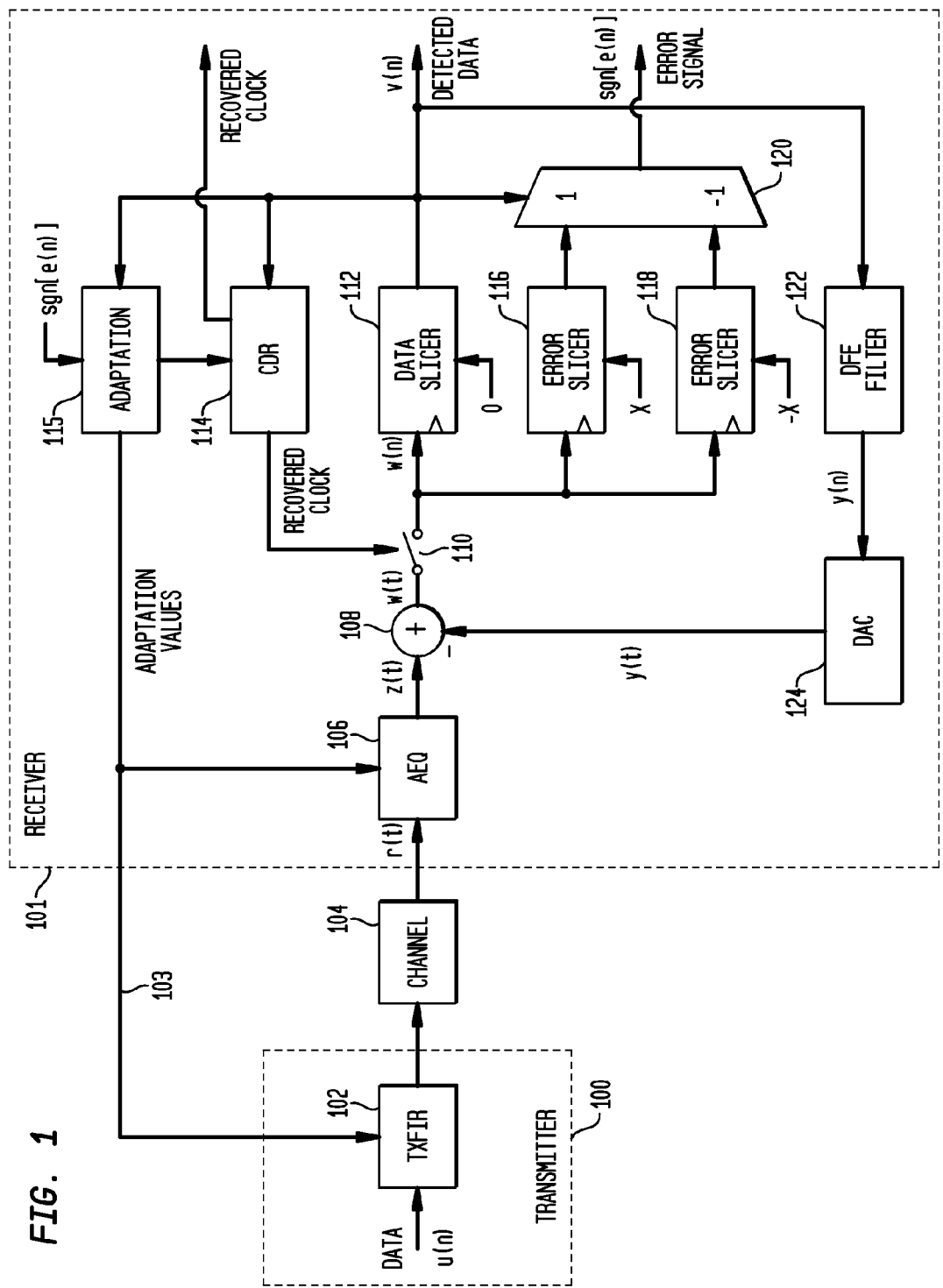
FIG. 1 shows an exemplary block diagram of a serializer-deserializer (SERDES) communication channel incorporating decision-feedback equalization and an analog equalizer (AEQ)

FIG. 1 shows a block diagram of a serializer-deserializer (SERDES) communication system employing a transmitting device 100, a communication channel 104, and a receiving device 101. Communication channel 104 might typically be implemented as a physical transmission medium, such as a backplane, drive head in a magnetic recording system, copper cables, or optical fibers. In the exemplary embodiment shown in FIG. 1, data is transmitted through communication channel 104 after optionally being equalized or filtered through transmit finite impulse response equalizer (TXFIR) 102. In some embodiments, the function of TXFIR 102 might optionally be moved from transmitter 100 to receiver 101.

After passing though communication channel 104, the analog transmit signal might optionally be filtered or equalized by analog equalizer (AEQ) 106 of receiver 101. AEQ 106 might comprise a continuous time analog filter. The analog signal output of AEQ 106, z(t), is given by equation (1):

$$z(t) = r(t) \star h_A(t) \tag{1}$$

where $\star$ denotes the continuous time convolution operation, r(t) is the signal received by receiver 101, and $h_A(t)$ is impulse response of AEQ 106. The post-DFE equalized signal at data slicer 112 input is w(t) prior to sampling. Decision feedback equalization (DFE) filter 122 generates a DFE correction signal, y(n), based on the data detected by data slicer 112. DFE correction signal y(n) is converted to a continuous time analog signal by digital-to-analog (DAC) converter 124. The analog correction signal, y(t), is subtracted at analog summer 108 from the output signal, z(t), of AEQ 106 to produce DFE corrected signal w(t), where w(t) is given by equation (2):

$$w(t) = z(t) - y(t) \tag{2}$$

DFE corrected signal w(t) is sampled by switch 110 to produce sampled signal w(n), where w(n) is given by equation (3):

$$w(n) = w(nT) \tag{3}$$

where T is the baud period and n is the sample number. The sampling operation is shown by virtue of switch 110. Many possible implementations for the sampling operation are known, for example by clocking data slicer 112 with a recovered clock generated by a clock and data recovery (CDR) circuit 214 to sample the corrected signal. CDR 214 is often implemented as an adaptive feedback circuit. The feedback loop adjusts the phase and frequency of the nominal clock to produce the recovered clock signal that samples the analog waveform to allow proper data detection. CDR 114 might typically be one of two types: a baud rate CDR and an oversampled CDR (such as a bang-bang CDR). Sampled signal w(n) is sliced by data slicer 112 to produce detected data v(n). As shown, CDR 114 might be in communication with one or more of AEQ 106 and TXFIR 102. Communication with TXFIR 102 might be via a backchannel 103.

Data slicer 112 compares input samples (e.g., in the digital domain) to a threshold, such as a zero-value threshold as shown, using the CDR recovered clock. Data slicer 112 might typically be implemented as a decision device based on an amplitude threshold, but might also be a more complicated detector such as an analog to digital converter (ADC) (not shown) and a sequence detector (not shown). Data slicer 112 produces a binary version of w(n) or a quantized version of w(n). If an ADC is employed, a multi-bit value is produced. For high speed applications, data slicer 112 might be clocked by the CDR recovered clock. Data slicer 112 quantizes the input signal to a binary "1" or "0" based on the sampled analog value and a slicer threshold, $s_t$. If the input to data slicer 112 at time n is w(n), then the output, v(n), of data slicer 112 is given by equation (4):

$$v(n) = 1 \text{ if } w(n) > s_t,$$

$$\text{otherwise, } v(n) = -1 \text{ if } w(n) \le s_t \tag{4}$$

Output signal v(n) is provided to DFE filter 122 to produce the filtered DFE output y(n), which is given by equation (5):

$$y(n) = \sum_{l=1}^{L} b(l) v(n-l) \tag{5}$$

where b(l) represents the DFE coefficients.

A set of additional data slicers, shown as error slicer 116 and error slicer 118, having non-zero thresholds X and −X generate a signed version of the sampled error signal, e(n). The value of X might be set to a nominal desired equalized target value. As described herein, AEQ 106 might have a transfer function, $H_A(s)$, given by equation (6):

$$H_A(s) = H_L(s) + KH(s) \tag{6}$$

where $H_L(s)$ is a low-pass response of AEQ 106, H(s) is a high-pass response of AEQ 106, and K is an adaptive parameter that controls the peaking of AEQ 106. The corresponding impulse response of AEQ 106 is given by equation (7):

$$h_A(t) = h_L(t) + Kh(t) \tag{7}$$

The input to data slicer 112 before sampling is thus given by equation (8):

$$w(t) = [r(t) \star h_L(t) + r(t) \star h_H(t)] - \sum_{l=0}^{B-1} b(l) v(n-l) \tag{8}$$

To determine the adaptation gradient for AEQ 106, the error signal, sampled at $t = nT + \tau$, where T is the baud period, and n is the sample number. The error signal, e(n), is given by equation (9):

$$e(n) = w(n) - [Xv(n)] \tag{9}$$

$$= [r(t) \star h_L(t) + r(t) Kh(t)]_{(t=nT+\tau)} -$$

$$\sum_{l=0}^{B-1} b(l) v(n-l) - v(n)$$

Taking the stochastic gradient of the error squared with respect to the peaking parameter, K, of AEQ 106, the impulse response weighted gradient (IRWG), ΔK(n), of the error signal is given by equation (10):

$$\Delta K(n) = \frac{\partial e(n)^2}{\partial K} = 2e(n) \frac{\partial e(n)}{\partial K} \tag{10}$$

Taking the derivative of e(n) with respect to K in equation (10) leads to equation (11):

$$\Delta K(n) = 2e(n) \frac{\partial [r(t) \star Kh(t)]_{t=nT+\tau}}{\partial K} \quad (11)$$

The differentiation operation and the integration corresponding to the convolution operation indicated by the ★ operator commute, leading to equation (12):

$$\Delta K(n) = 2e(n) \int_{\phi=0}^{\infty} r(\phi) h(nT+\tau-\phi) d\phi \quad (12)$$

Figure 5:
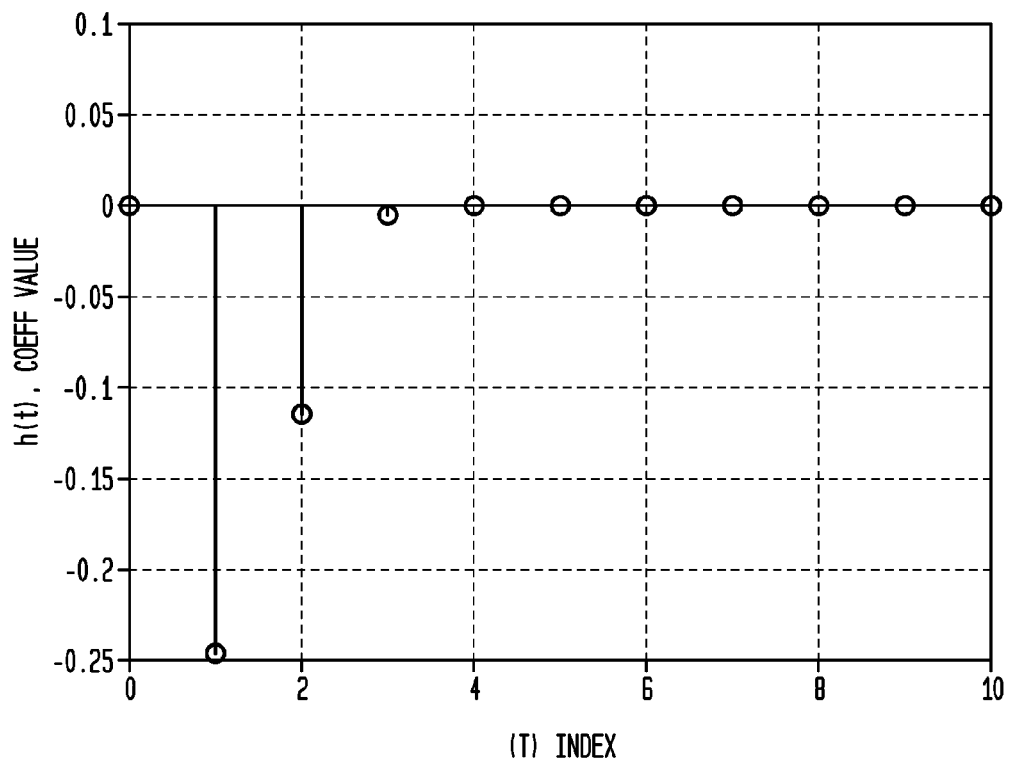
FIG. 5 shows an exemplary diagram of coefficients h(n) of the impulse response h(t) of the AEQ of FIG. 1.

The inventors have determined that it is desirable to consider equation (12) by approximating the integral as a sum and to consider φ= lT at baud spaced intervals over a finite interval, HT, where l=n−m, and to approximate the value of the error signal with the sign of the error signal. Further, to employ r(n) values, where r(n) is the sampled input to AEQ 106, r(n) might be sliced or quantized to a multi-bit value using an ADC (not shown). However, in embodiments of the present invention, the gradient calculation might be simplified by using DFE decisions, v(n) to approximate r(n). Thus, the inventors have determined that the IRWG, ΔK(n), of the error signal, e(n), with respect to the high frequency peaking parameter, K, of AEQ 106, as represented by equation (12) might be approximated by equation (13):

$$\Delta K(n) \cong 2 sgn[e(n)] \sum_{m=0}^{H-1} \tilde{h}(m) v(n-m) \quad (13)$$

where $\tilde{h}(m)$ represents selected sample values of the impulse response h(t), v(n) is the output signal of data slicer 112, m is the sample index, and sgn[e(n)] is the signed error signal, e(n). With regard to equation (9), τ is chosen such that the selected impulse response coefficients, $\tilde{h}(m) = h(mT+\tau)$, where $\tilde{h}(m)$ does not experience a peak value when m=0. FIG. 5, described subsequently, shows exemplary values of $\tilde{h}(m)$ where τ is chosen such that $\tilde{h}(m)$ does not experience a peak value when m=0.

Equation (13) represents a practical gradient algorithm where DFE decisions are weighted with the h(t) impulse response sampled terms (shown as h(m)) before being summed and multiplied by the sign of the error term. AEQ 106 might have its peaking factor, K, adapted according to equation (14):

$$K(n+1) = K(n) - 2\mu \Delta K(n) \quad (14)$$

where μ is the adaptation gain factor.

As shown in FIG. 1, receiver 101 might include adaptation module 115. Adaptation module 115 might be configured to receive data sample, data error sample and/or timing error sample information and clock signals, as well as data decisions and other information. The adaptation process might include timing adaptation to adaptively adjust timing of various clock signals based on various samples and a minimized error criterion. The adaptation process might further include equalization and gain adaptation to adaptively adjust filter parameters of various gain, DFE and AEQ elements based on various samples. Described embodiments of the present invention might, thus, minimize mean squared error of the detected signal.

Figure 2:
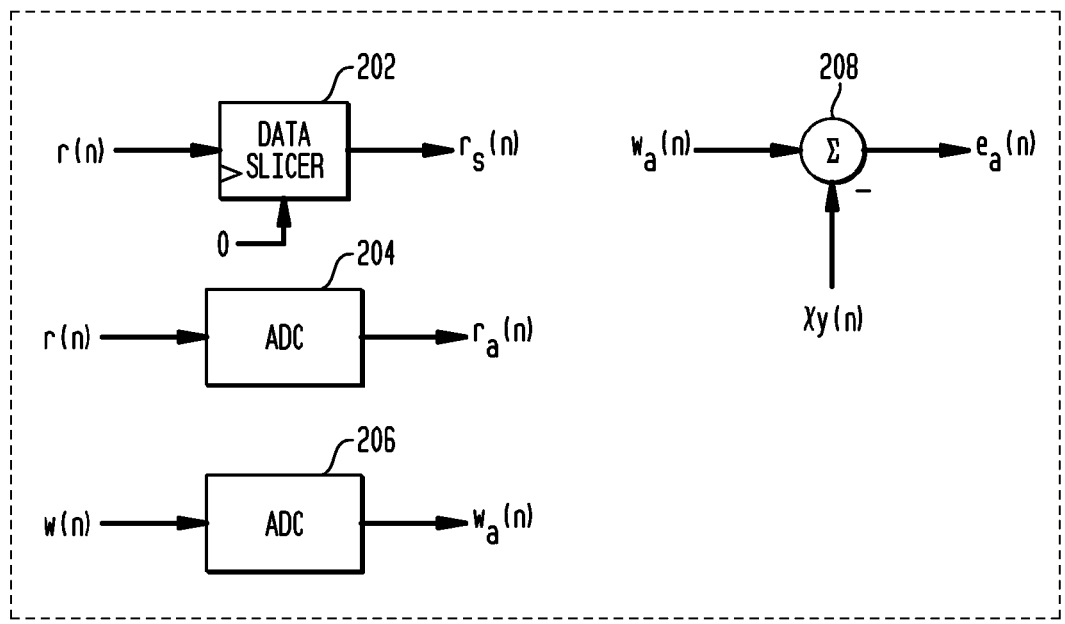
FIG. 2 shows an exemplary diagram of signals employed for adaptation of the AEQ of FIG. 1.

FIG. 2 shows exemplary signals which might be employed for adaptation by adaptation module 115. Equations (9) and (13) show the exemplary condition where the sgn[e(n)] signal is employed for the error portion of the gradient and r(n) and v(n) are employed for the signal portion. Since r(n) is an analog signal, as shown in FIG. 2, r(n) is either sliced to binary signal $r_s(n)$ by data slicer 202, which is distinct from data slicer 112, or is quantized to a multi-bit signal $r_a(n)$ by analog to digital converter (ADC) 204. Alternatively, some embodiments might employ $w_a(n)$ which is a multi-bit quantized version of w(n) by ADC 206, or $e_a(n)$ which is a multi-bit quantized version of e(n), by summer 208.

Figure 3:
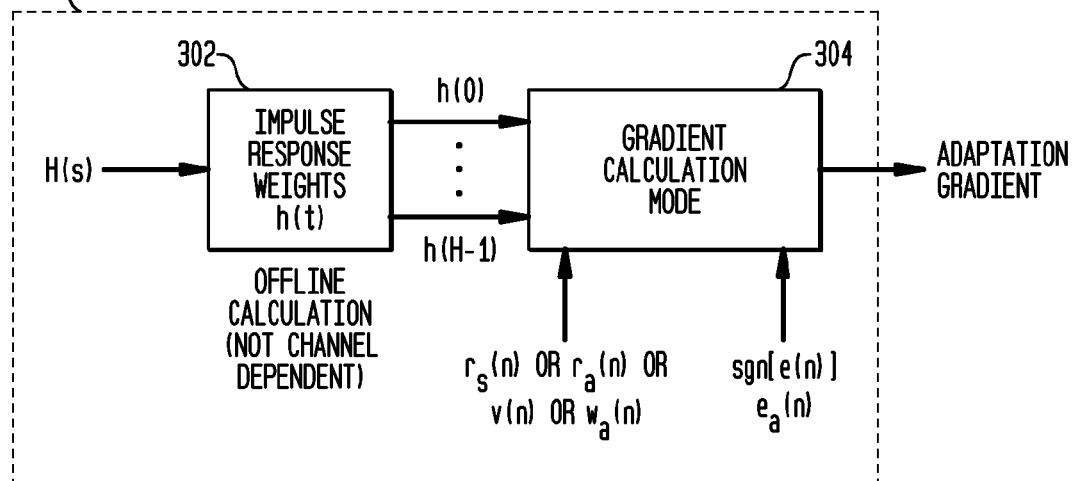
FIG. 3 shows an exemplary block diagram of an adaptation module of a clock and data recovery (CDR) module of the SERDES system of FIG. 1.

FIG. 3 shows that adaptation module 115 might include impulse response calculation module 302 and gradient calculation module 304. Impulse response calculation module 302 might generate one or more h(n) coefficients of AEQ 106, shown as h(0)–h(H−1). Impulse response calculation module 302 might store the one or more generated h(n) coefficients locally in a memory (not shown) of adaptation module 115, or might communicate the one or more generated h(n) coefficients to a storage element, microprocessor or other module of receiver 101. Gradient calculation module 304 might employ the one or more h(n) coefficients to generate the core gradient adaptation parameters for AEQ 106.

Figure 4:
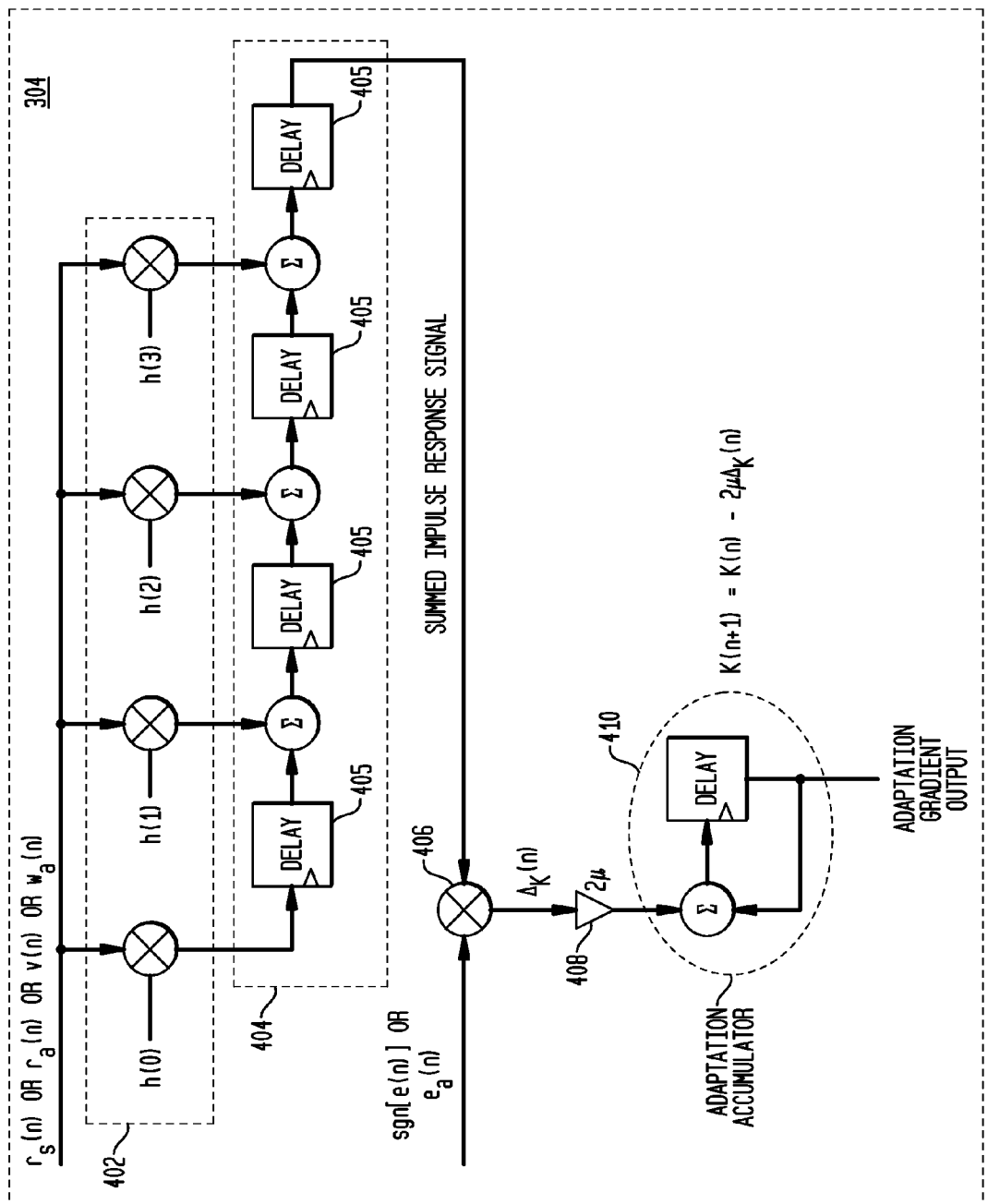
FIG. 4 shows an exemplary block diagram of an adaptation accumulation module of the adaptation module of FIG. 3.

FIG. 4 shows an exemplary implementation for gradient calculation module 304. As shown in FIG. 4, gradient calculation module 304 includes mixer block 402 which includes up to N multipliers, where N is the number of impulse response coefficients, h(n), employed by adaptation module 115. As shown in the exemplary case of FIG. 4, adaptation module 115 might employ 4 impulse response coefficients, h(0)–h(3). Each impulse response coefficient h(0)–h(3) is provided to a corresponding mixer in multiplier block 402. Each mixer also receives one of the input signals for adaptation as described in regard to FIG. 2 (e.g., one of signals $r_s(n)$, $r_a(n)$, v(n) or $w_a(n)$). The output signal of each mixer is the corresponding one of impulse coefficients h(0)–h(3) mixed with the adaptation input signal (e.g., one of signals $r_s(n)$, $r_a(n)$, v(n) or $w_a(n)$). Each mixed signal is provided to a corresponding delay element, shown as delay elements 405, which might be implemented as a digital single- or multi-bit flip-flop or latch. The output of each delay element is summed by adders 404 such that the mixed and quantized impulse response signals are summed and provided to multiplier 406. Multiplier 406 also receives the error signal (e.g., one of signals sgn[e(n)] or $e_a(n)$). The output of multiplier 406 is provided as the core gradient signal, ΔK(n). Core gradient signal ΔK(n) is provided to amplifier 408, where the core gradient signal might be amplified by a gain factor, μ. The output of amplifier 408 is provided to adaptation accumulator 410, which accumulates the adaptation gradient samples and outputs the adaptation gradient output signal. As described herein, the adaptation gradient output signal is given by equation (14), K(n+1)=K(n)−2μΔK(n), where μ is the gain factor of amplifier 408.

FIG. 5 shows an exemplary diagram of the impulse response coefficients h(n) employed by adaptation module 115. In an exemplary embodiment of the present invention, AEQ 106 might be implemented having a first order transfer function with second order parasitics such that AEQ 106 might include a 1 pole filter in its high pass filtering section. The pole location is indicated by α and a second order parasitic pole location is indicated by γ such that the transfer function of AEQ 106 is given by equation (15):

$$H_A(s) = \left(1 + K\frac{s}{s+\alpha}\right)\left(\frac{\gamma}{s+\gamma}\right)^2 \quad (15)$$

where the term $$\left(\frac{\gamma}{s+\gamma}\right)^2$$

represents the second order low pass parasitics of the transfer function.

Based on equation (6), it can be shown that equation (15) is represented by equation (16):

$$H(s) = \frac{s}{s+\alpha}\left(\frac{\gamma}{s+\gamma}\right)^2 \quad (16)$$

where the poles $\alpha$ and $\gamma$ are at a fraction of the symbol rate frequency, $f_s$.

Figure 7:
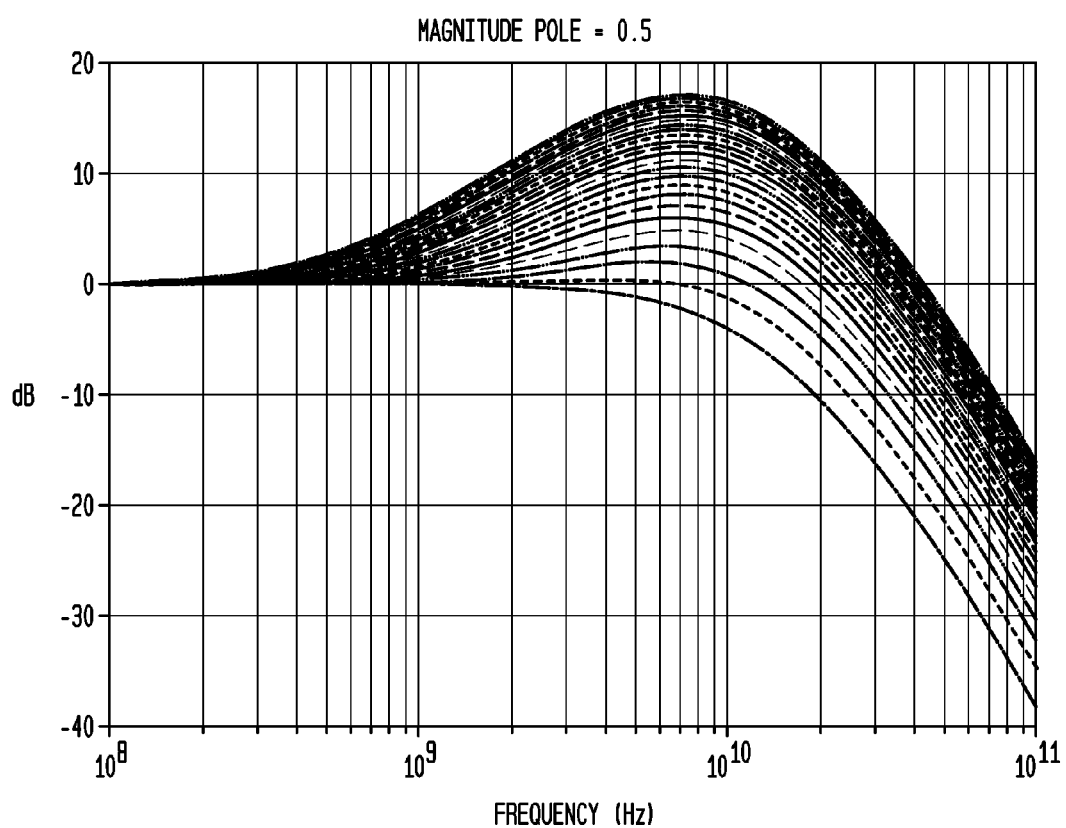
FIG. 7 shows an exemplary diagram of the frequency response of the AEQ of FIG. 1.

FIG. 7 shows an exemplary diagram of the frequency response of AEQ 106. As shown in FIG. 7, in an exemplary case, the location of pole a of AEQ 106 might be equal to $2\pi*0.5f_s$, and the location of parasitic pole $\gamma$ might be $2\pi*0.94f_s$. In an exemplary embodiment, $f_s$ might be equal to 14.025 GHz, which is the symbol rate in 16GFC Fibre Channel systems. The peaking factor, K, of AEQ 106 might be in the range of 0 to 12. As shown in FIG. 7, the frequency response for each value of K might typically have maximum peaking of approximately 17.1 dB near the Nyquist frequency of 7.0125 GHz. Based on equations (6) and (16), via partial fraction expansion and an inverse Laplace transform, it can be shown that, for time t≥0, the transfer function impulse response coefficients h(t) are given by equation (17):

$$h(t) = \frac{\gamma^2}{(\gamma-\alpha)^2}[-\alpha e^{-\alpha t} + \gamma e^{-\gamma t}] - \frac{\gamma^2}{\gamma-\alpha}[e^{-\gamma t} + t\gamma e^{-\gamma t}] \quad (17)$$

As described herein, h(t) can be generated for any H(s) transfer function given by equation (6), and also to AEQ transfer functions having multiple K terms of the form of equation (18):

$$H_A(s) = H_L(s) + \Sigma_{i=0}^{I-1} K_i H_i(s) \quad (18)$$

where the gradient of each $K_i$ is given by equation (19):

$$\Delta K_i(n) \cong 2\text{sgn}[e(n)]\left[\sum_{m=0}^{H-1} v(n-m)\tilde{h}_i(m)\right] \quad (19)$$

In some embodiments, instead of employing the impulse response weighted gradient (IRWG) given by equation (10), a unity weighted gradient (UWG), which replaces the impulse response coefficients with –1, might be employed. The UWG function employed by adaptation module 115 is given by equation (20):

$$\Delta K_U(n) \cong 2\text{sgn}[e(n)]\left[\sum_{m=0}^{H-1} v(n-m)\right] \quad (20)$$

The gradient signal generated by adaptation module 115 might be employed to adjust parameters of one or more modules of the SERDES communication system shown in FIG. 1 (e.g., AEQ 106). The adjustable parameters of the one or more modules might include pole location, a zero location and a gain value, which are adjusted based on the value of the gradient signal. In some embodiments, it might be possible to employ the gradient signal to modify the FIR tap weights of TXFIR 102 via backchannel 103. Adaptation module 115 might accumulate gradients for one or more samples in gradient calculation module 304, where the accumulated gradients, when the accumulated value reaches a configurable threshold value, correspond to a change in at least one of a gain setting, a zero location setting and a pole location setting of the at least one module (e.g., AEQ 106).

Figure 6:
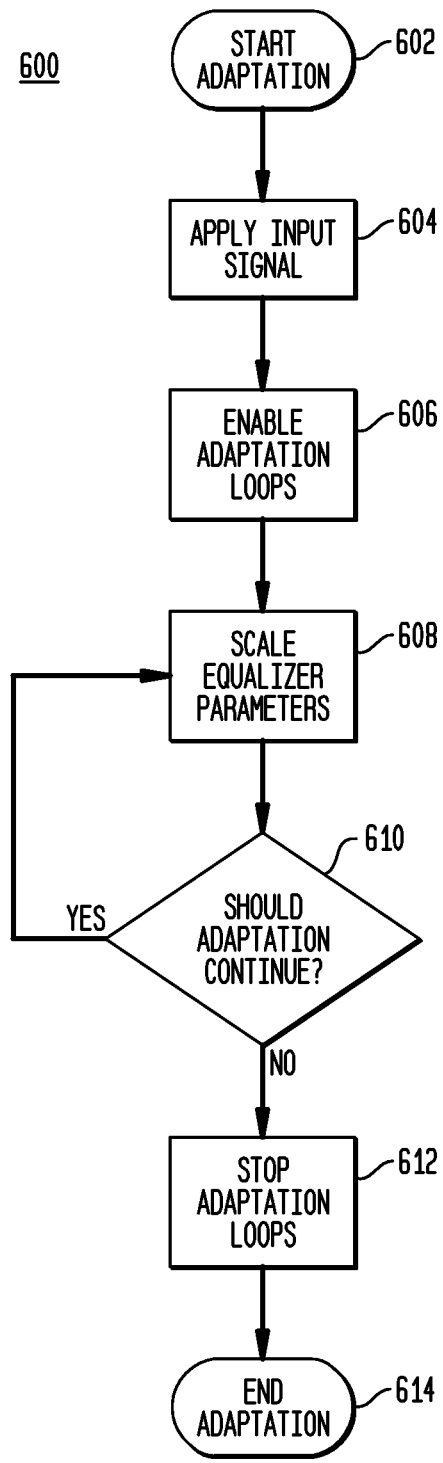
FIG. 6 shows an exemplary flow diagram of an adaptation algorithm employed by the adaptation module of FIG. 3.

FIG. 6 shows an exemplary flow diagram of adaptation algorithm 600 of the SERDES system shown in FIG. 1. At step 602, adaptation algorithm 600 starts. In some embodiments of the present invention, adaptation algorithm 600 might be run at during at least one of a startup condition of the SERDES system and a steady-state condition of the SERDES system. At step 604, an input signal from transmitter 100 is applied to receiver 101. At step 606, one or more adaptation loops of receiver 101 are enabled to perform the adaptation accumulation, for example by adaptation module 115. At step 606, one or more samples are taken of the signal received, r(t), by receiver 101. As described herein, the one or more samples are employed to generate an error signal e(n) and a gradient signal $\Delta K$. As described herein, gradient signal $\Delta K$ might be weighted by one or more impulse response coefficients of AEQ 106. At step 608, one or more parameters of at least one of TXFIR 102, DFE 122 and AEQ 106 are adjusted based on the generated gradient signal $\Delta K$. As described herein, the one or more parameter values might include a pole location setting, a zero location setting, and a gain setting. In some embodiments, adaptation algorithm 600 might stop based on some stopping criteria. For example, at step 610, one or more adaptation criteria might be checked to determine whether adaptation algorithm 600 should continue. For example, at step 610, if the peaking parameter, K, of AEQ 106 reaches a steady state and no longer changes within a tolerance for adaptation jitter, adaptation algorithm 600 might proceed to step 612 where the adaptation loops are stopped. In another example, known data might be transmitter from transmitter 100 to receiver 101 during a training period at startup of the SERDES system of FIG. 1, and a bit error rate might be measured by receiver 101. At step 610, if the BER is within a desired threshold, adaptation algorithm 600 might proceed to step 612 where the adaptation loops are stopped. Other criteria, or combinations of criteria might be employed. Some embodiments might stop adaptation algorithm 600 to avoid adaptation jitter. Other embodiments might continue to run adaptation algorithm 600 during steady state operation of the SERDES system to adapt AEQ 106 to compensate for some of the variation of channel 104, for example temperature or voltage variations. At step 612, the adaptation loops are stopped. At step 610, in embodiments where adaptation algorithm 600 is employed during a steady-state condition of the SERDES system, operation might return to step 610 to adapt the equalizer parameters. At step 610, in embodiments where adaptation algorithm 600 is employed during a startup condition of the SERDES system, operation might continue to step 612, where the adaptation loops are stopped, and then to step 614 where adaptation algorithm 600 ends.

As described herein, embodiments of the present invention provide a method of adjusting configurable parameters of at least one linear equalizer in a communication system. A transmitting device applies an input signal to a receiver. The at least one linear equalizer equalizes the input signal. A sampler generates one or more sampled values of the input signal.

A data detector digitizes the sampled values of the input signal. At least one error detection module generates an error signal based on one or more of a plurality of sampled values of the input signal and a target value. An adaptation module determines a gradient signal based on a comparison of one or more of the plurality of sampled values of the input signal and one or more of the plurality of values of the error signal. The adaptation module adjusts a transfer function of the at least one linear equalizer based on the determined gradient signal.

While the exemplary embodiments of the present invention have been described with respect to processes of circuits, including possible implementation as a single integrated circuit, a multi-chip module, a single card, or a multi-card circuit pack, the present invention is not so limited.

As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of adjusting configurable parameters of at least one linear equalizer in a communication system, the method comprising:
    applying, by a transmitting device, an input signal to a receiver of the communication system;
    equalizing, by the at least one linear equalizer of the receiver, the input signal;
    generating, by a sampler of the receiver, one or more sampled values of the equalized input signal;
    digitizing, by a data detector of the receiver, the one or more sampled values of the equalized input signal;
    generating, by at least one error detection module of the receiver, an error signal based on the one or more sampled values of the equalized input signal and at least one target value;
    determining, by an adaptation module of the receiver, a gradient signal based on a comparison of the digitized one or more sampled values of the equalized input signal and one or more values of the error signal; and
    adjusting, by the adaptation module, a transfer function of the at least one linear equalizer based on the determined gradient signal.

2. The method of claim 1, wherein when the at least one linear equalizer is a continuous time analog equalizer, the configurable parameters comprise at least one of: a pole location parameter, a gain parameter, and a zero location parameter.

3. The method of claim 1, wherein the transfer function of the at least one linear equalizer is given by $H_A(s)=H_L(s)+KH(s)$, where $H_L(s)$ is a low-pass transfer function of the at least one linear equalizer, $H(s)$ is a high-pass transfer function of the at least one linear equalizer, and $K$ is a high frequency peaking value of the at least one linear equalizer.

4. The method of claim 1, wherein the transfer function of the at least one linear equalizer is given by $H_A(s)=H_L(s)+\Sigma_{i=0}^{I-1}K_iH_i(s)$ where $H_L(s)$ is a low-pass transfer function of the at least one linear equalizer, $H_i(s)$ is a high-pass transfer function of an ith one of the at least one linear equalizer, and $K_i$ is a high frequency peaking parameter of the an ith one of the at least one linear equalizer.

5. The method of claim 4, wherein the gradient of each $K_i$ is given by $$\Delta K_i(n) \cong 2\text{sgn}[e(n)]\left[\sum_{m=0}^{H-1} v(n-m)\tilde{h}_i(m)\right]$$

where sgn[e(n)] is the error signal generated by the at least one error detection module, v(n−m) is the digitized one or more sampled values of the equalized input signal from the data detector, $\tilde{h}_i(m)$ is an impulse response coefficient of the ith one of the at least one linear equalizer, n is a sample index, and m is an impulse response coefficient index.

6. The method of claim 1, wherein the transfer function of the at least one linear equalizer is adapted according to $K(n+1)=K(n)-2\mu\Delta K(n)$, where $\mu$ is a gain factor of the at least one linear equalizer, K(n) and K(n+1) are adapted peaking parameters of the at least one linear equalizer, and ΔK(n) is the determined gradient signal.

7. The method of claim 1, wherein
the determined gradient signal is one of an impulse response weighted gradient signal and a unity weighted gradient signal,
the impulse response weighted gradient signal is given by $$\Delta K(n) \cong 2\text{sgn}[e(n)]\left[\sum_{m=0}^{H-1} v(n-m)\tilde{h}(m)\right]; \text{ and}$$

the unity weighted gradient signal is given by $$\Delta K_U(n) \cong 2\text{sgn}[e(n)]\left[\sum_{m=0}^{H-1} v(n-m)\right],$$

where sgn[e(n)] is the error signal generated by the at least one error detection module, v(n−m) is the digitized one or more sampled values of the equalized input signal from the data detector, h̃(m) is an impulse response coefficient, n is a sample index, and m is an impulse response coefficient index.

8. The method of claim 1, whereby adjusting the configurable parameters of the at least one linear equalizer in the communication system reduces a mean squared error of the communication system.

9. A non-transitory machine-readable medium, having encoded thereon program code, wherein, when the program code is executed by a machine, the machine implements a method of adjusting configurable parameters of at least one linear equalizer in a communication system, the method comprising:
applying, by a transmitting device, an input signal to a receiver of the communication system;
equalizing, by the at least one linear equalizer of the receiver, the input signal;
generating, by a sampler of the receiver, one or more sampled values of the equalized input signal;
digitizing, by a data detector of the receiver, the one or more sampled values of the equalized input signal;
generating, by at least one error detection module of the receiver, an error signal based on the one or more sampled values of the equalized input signal and at least one target value;
determining, by an adaptation module of the receiver, a gradient signal based on a comparison of the digitized one or more sampled values of the equalized input signal and one or more values of the error signal; and
adjusting, by the adaptation module, a transfer function of the at least one linear equalizer based on the determined gradient signal, 10. The non-transitory machine-readable medium of claim 9, wherein the at least one linear equalizer is a continuous time analog equalizer, wherein the configurable parameters comprise at least one of: a pole location parameter, a gain parameter, and a zero location parameter.

11. The non-transitory machine-readable medium of claim 9, wherein the transfer function of the at least one equalizer is given by $H_A(s)=H_L(s)+KH(s)$, where $H_L(s)$ is a low-pass transfer function of the at least one linear equalizer, H(s) is a high-pass transfer function of the at least one linear equalizer, and K is a high frequency peaking value of the at least one linear equalizer.

12. The non-transitory machine-readable medium of claim 9, wherein the transfer function of the at least one linear equalizer is given by $H_A(s)=H_{L(s)+\Sigma i=0}^{I-1}K_iH_i(s)$ where $H_L(s)$ is a low-pass transfer function of the at least one linear equalizer, $H_i(s)$ is a high-pass transfer function of an ith one of the at least one linear equalizer, and $K_i$ is a high frequency peaking parameter of the ith one of the at least one linear equalizer.

13. The non-transitory machine-readable of claim 12, wherein the gradient of each $K_i$ is given by $$\Delta K_i(n) \cong 2\text{sgn}[e(n)]\left[\sum_{m=0}^{H-1} v(n-m)\tilde{h}_i(m)\right]$$

where sgn[e(n)] is the error signal generated by the least one error detection module, v(n−m) is the digitized one or more sampled values of the equalized input signal from the data detector, h̃$_i$(m) is an impulse response coefficient of an ith one of the at least one linear equalizer, n is a sample index, and m is an impulse response coefficient index.

14. The non-transitory machine-readable medium of claim 12, wherein the determined gradient signal is one of an impulse response weighted gradient signal and a unity weighted gradient signal,
the impulse response weighted gradient signal is given by $$\Delta K(n) \cong 2\text{sgn}[e(n)]\left[\sum_{m=0}^{H-1} v(n-m)\tilde{h}(m)\right]; \text{ and}$$

the unity weighted gradient signal is given by $$\Delta K_U(n) \cong 2\text{sgn}[e(n)]\left[\sum_{m=0}^{H-1} v(n-m)\right],$$

where sgn[e(n)] is the error signal generated by the at least one error detection module, v(n−m) is the digitized one or more sampled values of the equalized input signal from the data detector, h̃(m) is an impulse response coefficient, n is a sample index, and m is an impulse response coefficient index.

15. The non-transitory machine-readable medium of claim 9, wherein the transfer function of the at least one linear equalizer is adapted according to K(n+1)=K(n)−2μΔK(n), where μ is a gain factor of the at least one linear equalizer, K(n) and K(n +1) are adapted peaking parameters of the at least one linear equalizer, and ΔK(n) is the determined gradient signal.

16. A communication system comprising:
a transmitting device configured to apply an input signal to a receiver of the communication system;
at least one linear equalizer of the receiver configured to equalize the input signal;
a sampler of the receiver configured to generate one or more sampled values of the equalized input signal;
a data detector of the receiver configured to digitize the one or more sampled values of the equalized input signal to generate detected data;

at least one error detection module of the receiver configured to generate an error signal based on the one or more sampled values of the equalized input signal and at least one target value; and an adaptation module of the receiver configured to (i) generate a gradient signal based on a comparison of the detected data and one or more values of the error signal, and (ii) adjust a transfer function of the at least one linear equalizer based on the generated gradient signal, whereby adjusting the configurable parameters of the at least one linear equalizer in the communication system reduces a mean squared error of the communication system.

17. The communication system of claim 16, wherein:
the at least one linear, equalizer is a continuous time analog equalizer,
wherein the configurable parameters comprise at least one of: a pole location parameter, a gain parameter, and a zero location parameter.

18. The communication system of claim 16, wherein the transfer function of the at least one linear equalizer is given by $H_A(s)=H_L(s)+KH(s)$, where $H_L(s)$ is a low-pass transfer function of the at least one linear equalizer, $H(s)$ is a high-pass transfer function of the at least one linear equalizer, and K is a high frequency peaking value of the at least one linear equalizer.

19. The communication system of claim 16, wherein the transfer function of the at least one linear equalizer is given by $H_A(s)=H_L(s)+\Sigma_{i=0}^{I-1}K_iH_i(s)$, where $H_L(s)$ is a low-pass transfer function of the at least one linear equalizer, $H_i(s)$ is a high-pass transfer function of an ith one of the at least one linear equalizer, and $K_i$ is a high frequency peaking parameter of the ith one of least one linear equalizer.

20. The communication system of claim 19, wherein the gradient of each $K_i$ is given by $$\Delta K_i(n) \cong 2\text{sgn}[e(n)]\left[\sum_{m=0}^{H-1} v(n-m)\tilde{h}_i(m)\right]$$

where sgn[e(n)] is the error signal generated by the at least one error detection module, v(n−m) is the detected data of the data detector, $\tilde{h}_i(m)$ is an impulse response coefficient of the ith one of the at least one linear equalizer, n is a sample index, and m is an impulse response coefficient index.

21. The communication system of claim 16, wherein the transfer function of the at least one linear equalizer is adapted according to $K(n+1)=K(n)-2\mu\Delta K(n)$, where μ is a gain factor of the at least one linear equalizer, K(n) and K(n+1) are adapted peaking, parameters of the at least one linear equalizer, and $\Delta K(n)$ is the generated gradient signal.

22. The communication system of claim 16, wherein
the generated gradient signal is one of an impulse response weighted gradient signal and a unity weighted gradient signal,
the impulse response weighted gradient signal is given by $$\Delta K(n) \cong 2\text{sgn}[e(n)]\left[\sum_{m=0}^{H-1} v(n-m)\tilde{h}(m)\right]; \text{ and}$$

the unity weighted gradient signal is given by $$\Delta K_U(n) \cong 2\text{sgn}[e(n)]\left[\sum_{m=0}^{H-1} v(n-m)\right],$$

where sgn[e(n)] is the error signal generated by the at least one error detection module, v(n−m) is the detected data of the data detector, $\tilde{h}(m)$ is an impulse response coefficient, n is a sample index, and m is an impulse response coefficient index.

23. The communication system of claim 16, wherein:
the transmitting device is implemented as a first integrated circuit chip;
the receiver is implemented as a second integrated circuit chip; and
a backchannel link is coupled between the first and the second integrated circuit chips.

* * * * *